(12) United States Patent
Auerbach et al.

(10) Patent No.: US 7,089,355 B2
(45) Date of Patent: Aug. 8, 2006

(54) SYSTEM AND METHOD FOR DETERMINING HARD DISK DRIVE PERFORMANCE

(75) Inventors: Daniel Jonathan Auerbach, San Jose, CA (US); Thomas E. Stanley, Gilroy, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 409 days.

(21) Appl. No.: 10/680,655

(22) Filed: Oct. 6, 2003

(65) Prior Publication Data
US 2005/0076175 A1    Apr. 7, 2005

(51) Int. Cl.
G06F 12/00 (2006.01)
(52) U.S. Cl. .................................. 711/112; 360/78.04
(58) Field of Classification Search ............... 711/111, 711/112, 167; 360/78.04, 78.07, 69
See application file for complete search history.

(56) References Cited

U.S. PATENT DOCUMENTS

| | | | | |
|---|---|---|---|---|
| 4,348,761 | A | 9/1982 | Berger | 371/21 |
| 6,429,996 | B1* | 8/2002 | Iwashiro | 360/78.07 |
| 6,434,499 | B1 | 8/2002 | Ulrich et al. | 702/115 |
| 6,515,819 | B1* | 2/2003 | Schmidt et al. | 360/78.04 |
| 6,848,019 | B1* | 1/2005 | Mobley et al. | 711/111 |
| 2002/0041460 | A1* | 4/2002 | Singer | 360/69 |

FOREIGN PATENT DOCUMENTS

| | | |
|---|---|---|
| JP | 8305502 | 11/1996 |
| JP | 2000056932 | 2/2000 |
| WO | WO02101744 | 12/2002 |

OTHER PUBLICATIONS

Intel Case Study: Maxtor measures Success with IPEAK Storage Toolkit. StorageReview.com's AnalyzeDisk Reference Guide. Intel IPEAK AnalyzeDisk White Paper. StorageReview.com's Testbed 3: Auditing IPEAK SPT web page. Internet archive http://developer.intel.com/design/ipeak/stortool;index.htm). Oct. 4, 1999.
Intel's Rank Disk White Paper. Knut Grimsrud. Aug. 29, 1995.

* cited by examiner

Primary Examiner—Brian R. Peugh
(74) Attorney, Agent, or Firm—John L. Rogitz

(57) ABSTRACT

A generic manufacturer-independent method to produce a metric of hard disk drive performance includes executing accesses from a reference sector on disk to several equidistantally-spaced target sectors, and recording the times of the accesses. These times are then ordered and used to generate shortest access times along with probabilities of achieving those access times, losing a disk revolution while accessing the target sector, and losing a disk revolution while executing a read/write operation.

21 Claims, 3 Drawing Sheets

SYSTEM AND METHOD FOR DETERMINING HARD DISK DRIVE PERFORMANCE

FIELD OF THE INVENTION

The present invention relates to hard disk drives.

BACKGROUND OF THE INVENTION

In current hard disk drives (HDD), data is written in concentric circular tracks by a magnetic recording head which is positioned above a spinning disk. The magnetic recording head consists of a write head element which is used during writing, and a read head element which is used during reading. The position of the magnetic recording head above the disk is precisely controlled by a hard disk drive controller as required to execute a read or a write.

The time it takes for the head to be positioned to execute the desired read or write may be thought of as a combination of a "seek time" (the time it takes the actuator arm to move the head over the right track) and a rotational latency time (the time it takes the desired sector of the track to rotate to a position underneath the head). It is desirable to minimize these times to speed up data transfer to and from the HDD. It will readily be appreciated that the time it takes a HDD to complete a data transfer event is an important performance metric that can be used to compare one HDD to other HDDs.

The problem to which the present invention is directed is in providing a reliable generic metric of HDD performance. Currently, drive manufacturers advertise various HDD performance times that are derived using proprietary and differing algorithms, meaning that comparisons between two HDDs cannot be reliably made. Having recognized this drawback, the solution herein is provided.

SUMMARY OF THE INVENTION

A method for providing a metric of the performance of a hard disk drive (HDD) includes establishing a reference sector and plural target sectors on the HDD. The target sectors in a track can be equidistantly spaced around the track. For each target sector, an access is executed from the reference sector, and the time that is associated with each access is recorded. Based on the times associated with the accesses, an output that is useful as a metric of the performance of the HDD is generated.

In a preferred embodiment, the access times are arranged in an ordered data structure from shortest time to longest, and this ordered data structure or a chart or graph generated from it can be graphically presented to the user. Preferably, plural accesses are executed for each target sector. As set forth further below, the shortest access time for each target sector among the plural access times for that target sector can be designated as the sector access time for the target sector and saved in the data structure. The remaining access times for the target sector can be used to determine a probability of achieving the sector access time for that target sector.

Furthermore, the access times for a target sector can be used to determine the probability of losing a disk revolution while accessing a target sector. Also, the access times can be used to determine the probability of losing a disk revolution while executing read or operation to that target sector.

In another aspect, a system for providing a measure of the performance of a hard disk drive (HDD) includes a digital processing apparatus that executes logic which embodies method acts. The method acts embodied by the logic includes executing accesses from a reference sector to plural target sectors arranged in tracks on the HDD, and, for each access, recording an access time. Then, the logic orders the access times in a data structure. The access times in the data structure are used to output a measure of performance of the HDD.

In still another aspect, a system for providing a measure of the performance of a hard disk drive (HDD) includes a digital processing apparatus which includes means for executing accesses from a single reference sector to plural target sectors on the HDD. The processing apparatus also includes means for determining times associated with respective accesses. Means are provided for using the times to determine a shortest access time and a probability of achieving the shortest access time as a metric of the performance of the HDD.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
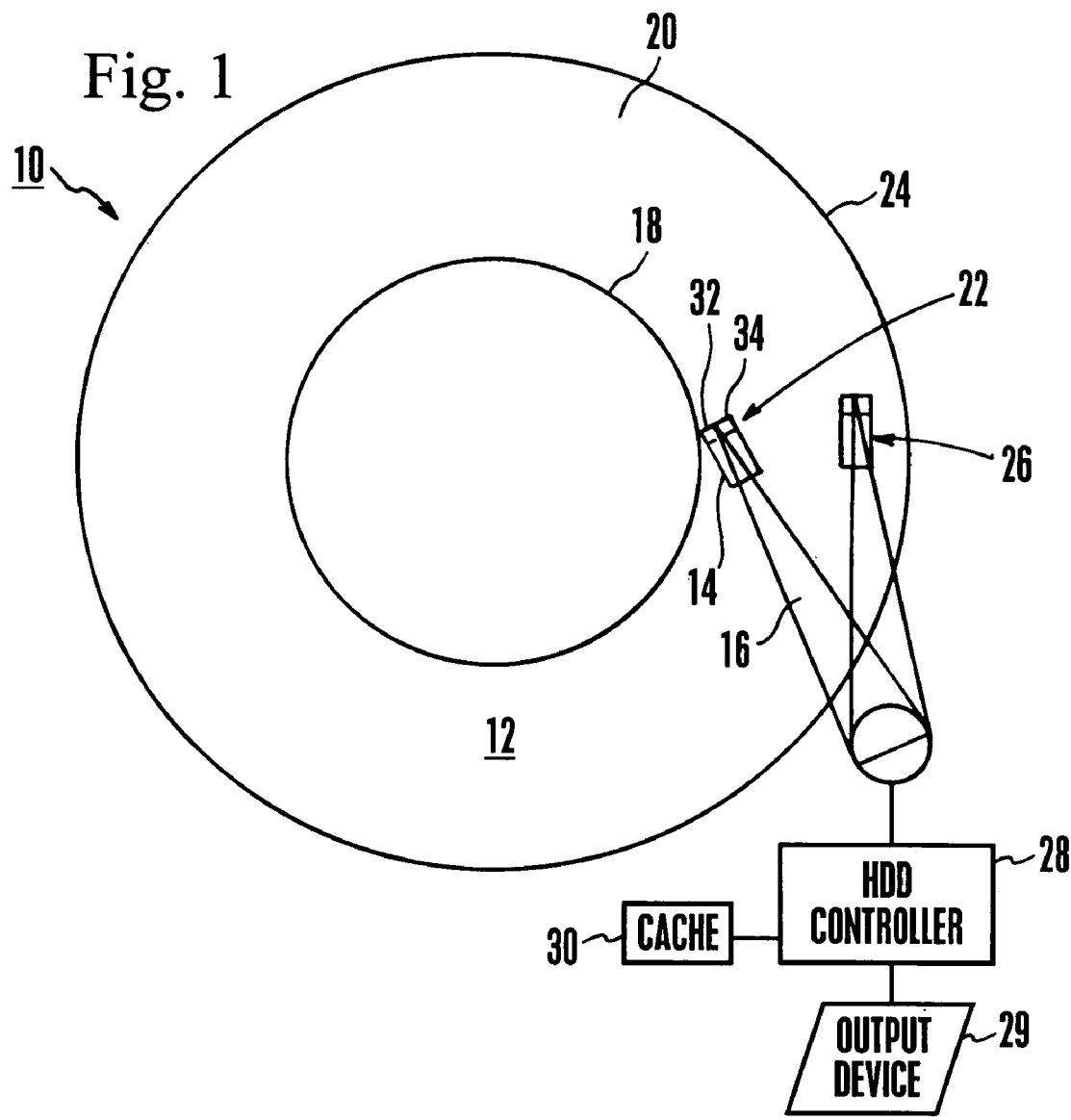
FIG. 1 is a schematic view of the hard disk drive, showing the actuator arm near the inner diameter (ID) and the outer diameter (OD) of the disk.

Referring initially to FIG. 1, a data storage system is shown, generally designated 10, which includes one or more (only one shown for clarity) rotatable hard disks 12 onto which data can be written and from which data can be read by a read/write head 14 that is mounted on an actuator arm 16 for movement of the head 14 over the disk 12 between an inner diameter (ID) 18 of a data storage area 20 of the disk 12 (indicated at position 22 of the head 14) and an outer diameter 24 of the storage area 20 (indicated at position 26 of the head 14). The head 14 and actuator 16 may be controlled by a digital processing apparatus such as a hard disk drive (HDD) controller 28, which may execute the below-described method in accordance with present principles. Or, another digital processing apparatus that communicates with the controller 28 may execute the logic. The controller 28 may output the results of the method to an output device 29, such as a printer, another computer, a monitor, etc. for observation and evaluation thereof by a person or computer. The controller 28 may also access a solid state data cache or buffer 30.

In accordance with HDD principles known in the art and as figuratively shown in FIG. 1, the head 14 may include a write element 32 and a read element 34. The head 14 may be configured for longitudinal recording or for perpendicular recording.

Figure 2:
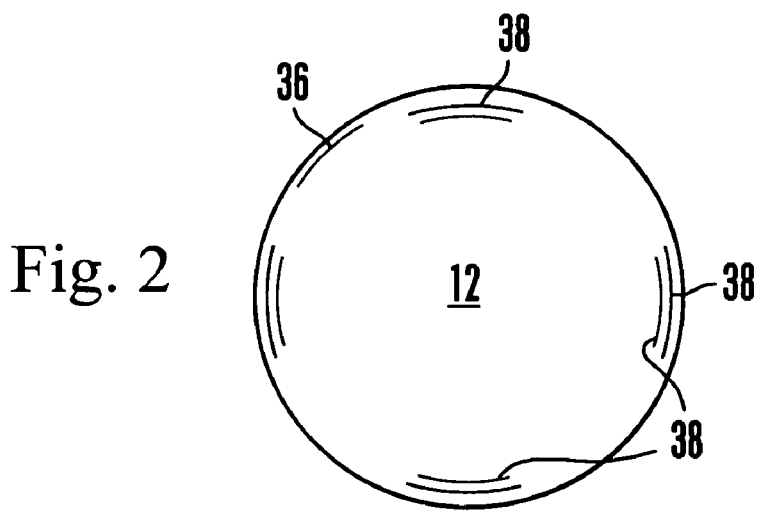
FIG. 2 is a schematic view of the disk, showing the reference and target sectors.

As shown in FIG. 2 and as set forth more fully below, one or more of the disks 12 may include at least one reference sector 36, from which evaluation accesses are made, and plural target sectors 38, to which accesses are made. The reference sector 36 may be near the outer diameter of the disk 12. The target sectors 38 may be portions of selected circular target tracks as shown, with a set of target sectors of a track being equidistantly spaced in the angular dimension around the circumference of the track as shown (only one set shown). It is to be understood that one set of equidistantly spaced target sectors corresponds to a respective seek distance, while other sets of equidistantly spaced target sectors may be selected that correspond to other seek distances for which data is desired. Equivalently, one or a few sets of target sectors may be selected and respective reference sectors from which accesses are made can be established, one reference sector per desired seek distance. While for clarity only two target tracks and four target sectors 38 per track are shown, it is to be understood that many more target tracks may be used in the logic below, with many more equidistantly spaced target sectors 38 per track, with many more seek distances (target sector sets). For example, there may be twenty five target sectors per track.

Figure 3:
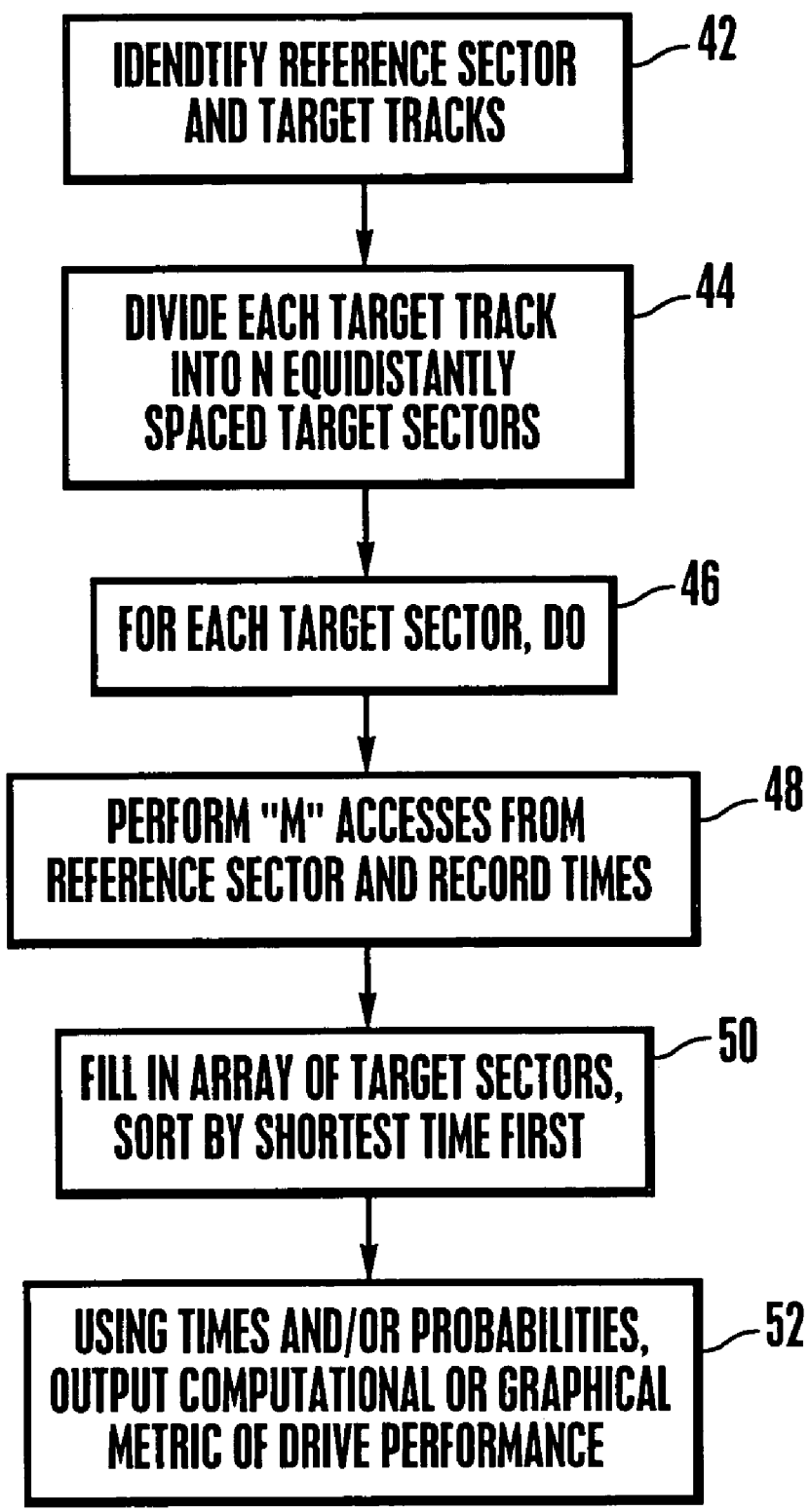
FIG. 3 is a flow chart of the present logic.

FIG. 3 shows the present logic as applied to generate data for one set of target sectors, which may run by a digital processing apparatus such as the controller 28 or other apparatus in a Windows® operating system and be embodied in a C/C++ program. The preferred logic can be implemented using standard computer serial interface (SCSI) commands so that it can be generically applied to any SCSI-compliant random access device, such as to any SCSI-based HDD. More generally, the present invention can be applied to any product that has an LBA to cylinder head sector translation such as fiber channel, serial ATA, and serial SCSI. The logic below may be embodied in electronic storage accessible to the digital processing apparatus to execute the disclosed functions.

Commencing at block 42, the reference sector 36 is defined or otherwise identified (along with which one of the disk heads will be used for the evaluation measurements). The reference sector 36 advantageously may be located near the outer diameter of a disk 12 of the HDD. Also, target tracks are defined or otherwise identified. Specifically, circular target tracks, e.g., three hundred tracks on the disk, can be identified as target tracks from among the many thousands of tracks on the disk. The sets of target tracks preferably span the disk from ID to OD.

At block 44, to establish a set of target sectors each target track is divided into equidistantally spaced target sectors. In the preferred embodiment, the physical reference and target sectors preferably are translated to logical block addresses (LBAs) using, e.g., the SCSI command SEND_RECEIVE_DIAGNOSTICS. In dividing a target track into target sectors, the minimum and maximum LBAs for the track are identified in accordance with means known in the art and then the number of available sectors on the track is determined. Every $n^{th}$ sector is identified as a target sector such that the target sectors are equidistantally spaced around the track. The target sectors may number from two to twenty five or more of the available data sectors on the track.

Block 46 indicates that a DO loop is entered for each target sector. Moving to block 46, at least one preferably plural ("m") accesses are performed from the reference sector to each target sector using, e.g., a READ10 or WRITE10 SCSI command. As an example, twenty five accesses per target sector may be executed. For each access, the elapsed time to execute the access is recorded.

Proceeding to block 50, an array or other appropriate data structure is filled in correlating the LBAs of the target sectors with the access times measured in Block 48. In a particularly preferred embodiment, the shortest access time among the "mn" times for each target sector functions as the segment access time for that segment and is recorded as such. Also, the probability of achieving the shortest access time is recorded. As critically recognized herein, both the time and probability of a successful access (sometimes referred to as the probability of successfully settling on the track during the minimum seek time) will be minimized for the best access time to some target sectors, because for such sectors, the HDD head arrives just as the sector rotates under the head. However, because of slight variations in actuator move times the HDD will from time to time just miss the sector as it rotates past, requiring the disk to pass through another entire revolution to place the sector under the head for the access.

As an example, suppose that a target sector's best access time among twenty five accesses is ten milliseconds (10 ms), but that in twenty four of twenty five accesses the head "just missed", requiring another revolution adding on another six milliseconds (6 ms). The probability of a successful access in the shortest time (10 ms) in this example would be 1/25, with a probability of 24/25 that an entire disk revolution will be lost and that consequently the access will consume sixteen milliseconds. In this case, the shortest access time—10 ms—is recorded for the sector in the data structure, along with an indication that the probability of achieving that access time is only 1/25. If the data structure is presented on the output device 29 as a visual representation of an array of LBAs versus access times, the access times may be color coded or gray shaded to indicate relative probabilities.

Additionally, an effective access time for a target sector may be calculated if desired by weighting the various access times recorded for a target sector according to their computed probabilities. In the example above, only two access times are hypothesized over the twenty five accesses, so the effective access time would be {10 ms(1/25)+16 ms(24/25)}.

Block 50 indicates that the array is sorted by access time. In one preferred embodiment, the LBAs in the array are sorted in order by their segment access times.

Proceeding to block 52, using the above times and/or probabilities and/or the further probabilities below, a computational or graphical metric is output of the performance of the HDD. For instance, the access times in the array and their probabilities may be averaged together and output as an indication of overall HDD access time/probability performance. Or, the effective access times of the target segments may be averaged together and output. Yet again, some or all of the data generated by the present invention may be input to a commercial model that outputs an average input/output time metric in accordance with HDD modeling principles known in the art. Also, the probability of losing a disk revolution while accessing a target sector (which equals 1-probability of successful access in shortest time, also referred to as the probability of successfully settling on the track during the minimum seek time) can be determined from the above.

Moreover, the present invention recognizes that in theory, the target sectors of a track should sort in order because of rotational latency, but that in the event of misses in reading or writing, the sorted order will be upset because additional revolutions of the disk are required to complete the read/write. Thus, the conditional probability that, given a successful settling on track, a subsequent read or write operation is successfully executed may also be computed as set forth further below. This conditional probability essentially is the probability of losing a disk revolution while executing a read operation or a write operation and it may be determined by observing the sorted array as set forth further below.

Figure 4:
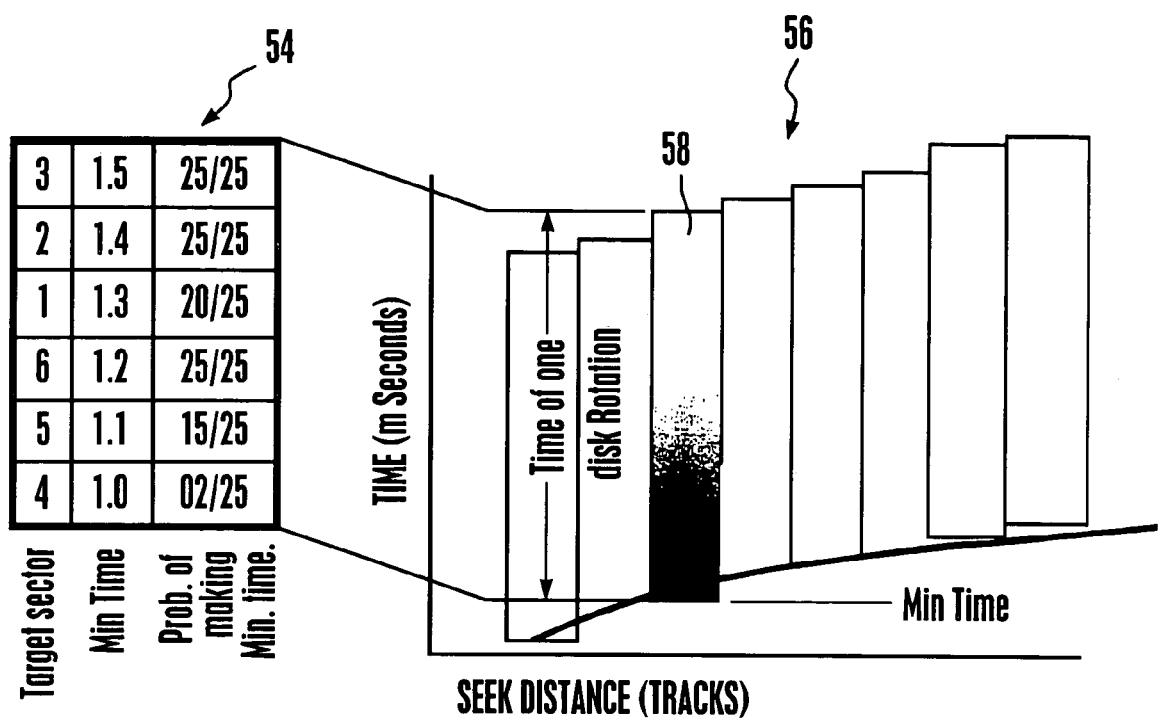
FIG. 4 is a schematic diagram of the ordered list of target sectors ordered by seek time, juxtaposed with an exemplary graph output by the method that is useful in evaluating HDD performance.

FIG. 4 illustrates. A list 54 of target sectors is shown with the sectors (labelled 1–6 in the first column) ordered by their minimum access times as measured during the plural (e.g., 25) seeks to each target sector from the reference sector. The second column of the list 54 sets forth the minimum access time for each target sector. The third column then indicates how many seeks the minimum time was achieved and how many total seeks were executed from the reference sector to each particular target sector.

Thus, for example, for the first target sector (#3) in the list, the minimum access time was 1.5 time units (e.g., milliseconds), and this time was achieved in 25 of 25 seeks. In contrast, for the last target sector (#4) in the list 54, although it is listed last because it had the shortest access time (1.0), this time was achieved in only two of the 25 seeks to that sector, as indicated by the list 54. For this sector, the probability of losing a revolution while settling (probability of losing a disk revolution while accessing a target sector) is 1-2/25, or 23/25.

Moreover, the ordered list 54 can be used to determine the above-mentioned conditional probability of losing a revolution while reading or writing, given a successful settling. Specifically, note that while sector #1 has a minimum access time that is between the minimum access times of sector nos. 2 and 6, and that both sector nos. 2 and 6 have a probability of unity of successful settling, the shortest access time was achieved in only twenty of twenty five seeks for sector #1, an unexpected result given its intermediate location between sector nos. 2 and 6 and their "perfect" settling probabilities. From this it is apparent that given a successful settling, there is a 5/25=20% probability that a revolution will be lost for sector #1 during a read or write operation.

FIG. 4 shows that the list 54 can be used to generate a graph 56 that can be output for display on the output device 29 for observation by a person. The disclosure above focused on the logic for measuring times for one set of target sectors, i.e., for one seek distance, but recall that plural sets of target sectors can be used corresponding to plural seek distances (or, equivalently, that plural reference sectors corresponding to plural seek distances or some combination of the two). Each bar 58 in the graph 56 corresponds to a seek distance. Accordingly, the list 54, which corresponds to one seek distance, establishes one of the bars 58 as indicated, with the seek times of the target sectors 1–6 being stacked on each other to establish the height of the bar 58 and with the probabilities in the third column of the list 54 establishing the shade or color of its respective segment of the bar. By comparing a graph 56 from one disk drive against that for another disk drive, a user can visually compare the performances of the drives.

While the particular SYSTEM AND METHOD FOR DETERMINING HDD PERFORMANCE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A method for providing at least one metric of a performance of a hard disk drive (HDD), comprising:
   establishing at least one reference sector and plural target sectors on the HDD, the target sectors in a track being equidistantly spaced around the track;
   for each target sector, executing at least one access from the reference sector;
   recording a time associated with each access; and
   based at least in part on the times associated with the accesses, generating at least one indication of the performance of the HDD.

2. The method of claim 1, wherein at least the times are arranged in an ordered data structure from shortest time to longest.

3. The method of claim 1, wherein plural accesses are executed for each target sector.

4. The method of claim 3, wherein a shortest access time for each target sector among the plural access times for that target sector is designated as the sector access time fir the target sector, and the remaining access times for the target sector are used to determine a probability of achieving the sector access time for that target sector.

5. The method of claim 4, wherein the access times for a target sector are used to determine at least one of: the probability of losing a disk revolution while accessing a target sector, and the probability of losing a disk revolution while executing at least one of: a read operation, and a write operation, to that target sector.

6. The method of claim 2, wherein the indication is used to generate a graphical representation of the ordered data structure.

7. The method of claim 1, wherein the indication is used as an input to a model outputting an average input/output time metric.

8. A system for providing a measure of the performance of a hard disk drive (HDD), comprising:
   at least one digital processing apparatus executing logic embodying method acts comprising:
   executing accesses from at least one reference sector to plural target sectors arranged in tracks on the HDD;
   for each access, recording an access time;
   ordering the access times in a data structure; and
   using at least some access times in the data structure to output a measure of performance of the HDD.

9. The system of claim 8, wherein the target sectors of a track are equidistantly spaced around the track.

10. The system of claim 9, wherein plural accesses are executed for each target sector, each access having an associated access time.

11. The system of claim 9, wherein a shortest access rime for each target sector among the plural access times for that target sector is designated as the sector access time for the target sector, and the remaining access times for the target sector are used to determine a probability of achieving the sector access time for that target sector.

12. The system of claim 11, wherein the access times for a target sector are used to determine at least one of: the probability of losing a disk revolution while accessing the target sector, and the probability of losing a disk revolution while executing at least one of: a read operation, and a write operation, to the target sector.

13. The system of claim 9, wherein a graphical representation of the data structure is output.

14. The system of claim 9, wherein a model is used to receive at least some information representative of access times and outputting an average input/output time metric.

15. A system for providing a measure of the performance of a hard disk drive (HDD), comprising:
at least one digital processing apparatus including:
means for executing in least one access from a single reference sector to plural target sectors on the HDD;
means for measuring actual times of at least some respective accesses; and
means for using the times to determine at least one shortest access time and at least one probability of achieving the shortest access time.

16. The system of claim 15, wherein the digital processing apparatus further comprises:
means for ordering the times in a data structure.

17. The system of claim 15, wherein the digital processing apparatus further comprises:
means for establishing target sectors in a single data track to be equidistantally spaced round the track.

18. The system of claim 15, wherein plural accesses are executed by the digital processing apparatus for each target sector, each access having an associated access time.

19. The system of claim 16, comprising means for designating a shortest access time for each target sector among the times for that target sector as a sector access time for the target sector, and means for using the remaining times for the target sector to determine a probability of achieving the sector access time for that target sector.

20. The system of claim 19, comprising means for using the access times for a target sector to determine at least one of: the probability of losing a disk revolution while accessing the target sector, and the probability of losing a disk revolution while executing at least one of: a read operation, and a write operation, to the target sector.

21. The system of claim 16, comprising means for outputting a graphical representation of the data structure.

* * * * *